United States Patent [19]

Sallas et al.

[11] Patent Number: 4,855,967
[45] Date of Patent: Aug. 8, 1989

[54] SEISMIC VIBRATOR HOLD-DOWN WEIGHT MONITOR/CONTROLLER

[75] Inventors: John J. Sallas, Plano; Richard M. Weber, Prosper; David S. Lamance, Princeton, all of Tex.

[73] Assignee: Halliburton Geophysical Services, Inc., Houston, Tex.

[21] Appl. No.: 289,506

[22] Filed: Dec. 22, 1988

Related U.S. Application Data

[63] Continuation of Ser. No. 65,458, Jun. 23, 1987, abandoned.

[51] Int. Cl.$^4$ .............................................. G01V 1/04
[52] U.S. Cl. ...................................... 367/190; 181/114
[58] Field of Search .............. 181/113, 114, 121, 401;
367/143, 75, 189, 190; 73/665, 666, 667, 668;
340/58; 248/638; 254/55, 89 H, 90, 93, 93 HP

[56] References Cited

U.S. PATENT DOCUMENTS

| | | | |
|---|---|---|---|
| Re. 25,401 | 6/1963 | Clynch | 181/114 |
| 4,011,923 | 3/1977 | Talke et al. | 181/114 |
| 4,063,613 | 12/1977 | Silverman | 181/114 |
| 4,116,300 | 9/1978 | Stone | 181/114 |
| 4,519,053 | 5/1985 | Bedenbender et al. | 367/190 |

Primary Examiner—Brian S. Steinberger
Attorney, Agent, or Firm—Mark E. McBurney; Joseph A. Walkowski

[57] ABSTRACT

The disclosure relates to a seismic vibrator having an airbag isolator, a transducer for monitoring the instantaneous air pressure within the airbags, a summer to add the pressures within each air bag and a calibrated weighting network to convert the composite pressure for display as holdown weight on a meter and for comparing the measured holdown against a preset threshold that is used to enable or disable sweep generation or operation of an inducer. The system also includes structure for comparing the measured holdown against a preset threshold that is used as a feedback signal to the lift system and for providing a signal proportional to holdown weight to the sweep generator for use as a feedback signal to modify the amplitude of the force generated by the actuator.

17 Claims, 7 Drawing Sheets

SEISMIC VIBRATOR HOLD-DOWN WEIGHT MONITOR/CONTROLLER

This application is a continuation of application Ser. No. 065,458, filed June 23, 1987 now abandoned.

BACKGROUND OF THE INVENTION

1. Field of the Invention

This invention relates to seismic vibrators and, more specifically, to a system for monitoring and controlling the hold-down weight of a seismic vibrator.

2. Brief Description of the Prior Art

The currently used seismic p-wave vibrators utilize an actuator to generate a force that is imparted through a baseplate or pad in contact with the surface of the earth. The weight of the vehicle upon which the actuator is installed is used to provide a static force load on the baseplate. If inadequate static force (hold-down) is provided, the baseplate will lose contact with the earth and signal to noise level degradation will occur as a result thereof because harmonic noise is produced when the baseplate loses such contact. This phenomenon is called decoupling. In most vibrators used today, the hold-down force is applied to the baseplate through a system of airbags. The airbags act as acoustic isolators, their low spring rate in conjunction with the mass of the vehicle forming a mass/spring system which has a low resonant frequency, typically less than 2 hertz. The airbag system thus acts as an acoustic isolator, permitting the static force provided by the vehicle weight to be applied to the baseplate but blocking forces generated by the actuator (sweep frequencies are greater than 5 hertz typically) from acting on the vehicle frame.

The vibrator is also equipped with a lift system for raising and lowering of the baseplate. When a sweep is to be generated, the baseplate must be in contact with the earth. The vehicle is jacked up so that as much of the vehicle weight is applied to the baseplate as possible, the wheels generally still contacting the earth. Often, on truck mounted actuators, two or more wheels may actually lose contact with the earth when the vehicle is jacked up.

A sweep interlock system is implemented on all systems currently in use. This interlock system requires the pad (baseplate) to be down before a sweep can be initiated. The interlock systems in current use determine this condition by monitoring the position of the pad with respect to a preset location relative to the vehicle frame or the pad is always lowered to its maximum extension until a mechanical stop is reached. From the standpoint of maximum time savings, it is best to not lower the pad any more than required to achieve adequate hold-down. It takes time to raise and lower the pad (this operation may exceed 1500 times per day). The less stroke used, the less time spent for this operation.

In uneven terrain, the extension required to achieve adequate hold-down is highly variable. For example, if the pad is positioned over a hole but the truck wheels are on high ground, the baseplate must be lowered considerably further to achieve adequate hold-down than in a situation where the baseplate is located over a mound. Also, the current interlock system may indicate the pad is down even though the pad is not in contact with the earth if the pad is over a depression.

A further problem with prior art systems is that the baseplate moves rapidly into the hold-down position, often making forceful contact with the earth and setting up impulses that are later picked up during a seismic test. Also, upon raising the pad after a sweep during the recording time, rapid pad movement can also be a source of unwanted seismic noise as is the noise generated when the vehicle tires come in contact with the earth.

SUMMARY OF THE INVENTION

In accordance with the present invention, the above noted deficiencies of the prior art are minimized. Briefly, this is accomplished by providing a seismic vibrator equipped with airbag isolators, transducer means for monitoring the instantaneous air pressure within the airbags, a summer to add these pressure signals together, a calibrated weighting network to convert the composite pressure for display as hold-down weight on a meter, means for comparing the measured hold-down against a preset threshold that is used to enable or disable sweep generation or operation of an indicator, means for comparing the measured hold-down against a preset threshold that is used as a feedback signal to the lift system, also means for providing a signal proportional to hold-down weight to the sweep generator for use as a feedback signal to modify the amplitude of the force generated by the actuator. As a refinement to the approximation, the actuator weight is accounted for in the summed signal so that its weight is included in the hold-down computation.

The disclosed invention anticipates the use of force transducers like strain gauges or load cells placed on load bearing members of the lift system as an alternate method of monitoring the hold-down force. Also, it is not limited to the use of electrical circuitry for display. Mechanical pressure switches and gauges may also be used.

When the weight of the truck acts upon the airbags, an air pressure increase occurs in the airbags. Typically, the airbags are inflated to 60 psi with no load (there may be chains in tension which limit the amount of airbag dimensional expansion permitted). When weight is applied to the foot piece, the pressure within an airbag will increase to roughly 90 psi on a level surface. Each airbag may be thought of as having an effective piston area, the load borne by an airbag being the product of the pressure and piston area. When the pad is lowered and the airbags compressed, all chains are slack unless operating on a severe incline, thus the effect of the chains can be ignored.

The invention herein offers the potential of increased productivity and better data quality. The time between records provided for moveup can be minimized. The direct display of hold-down will show that roughly 95% of the weight of the truck is applied to the pad before the tires leave the ground. Thus the practice of jacking the vibrator too high just so daylight can be seen will be minimized. Also, it is anticipated that the noise associated with the truck tires hitting the ground will be reduced since there is less potential energy stored in elevating the vibrator too high. Further, in uneven terrain, consistent coupling will be easier to attain.

A further feature of the present invention is the ability to move rapidly to a location close to the hold-down position with slow movement over the final incremental distance to prevent or minimize the possibility of the baseplate striking the ground with sufficient force to set up waves which will erroneously be read during a subsequent test. Also, the invention contemplates decoupling the baseplate from the earth at an initial slow rate with subsequent speed up in the rate of decoupling and lifting of the baseplate.

DESCRIPTION OF THE PREFERRED EMBODIMENTS

Figure 1:
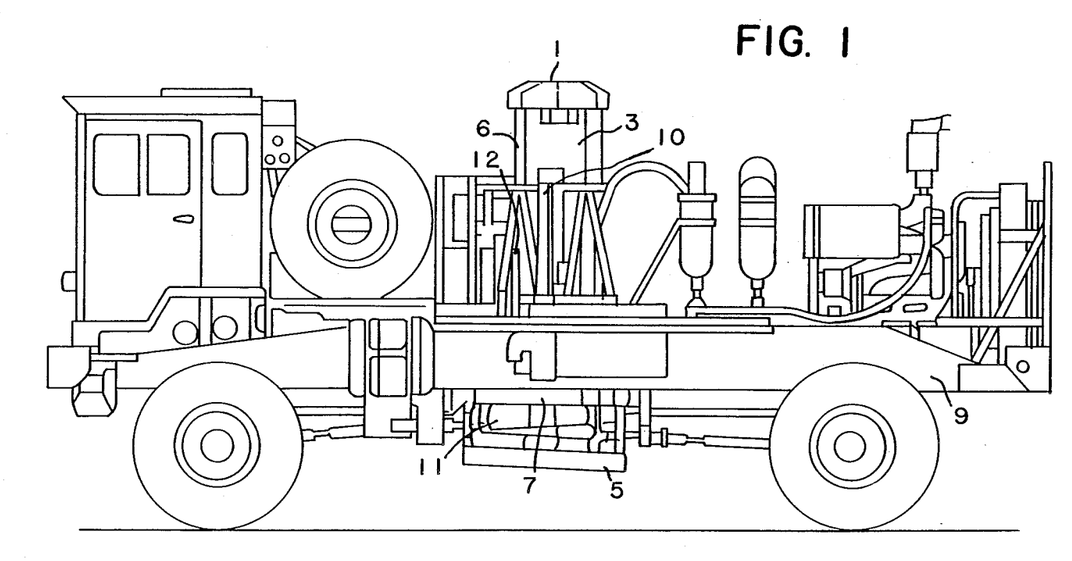
FIG. 1 is a diagram of a typical prior art vehicle for transporting and operating a seismic vibrator.
Figure 2A:
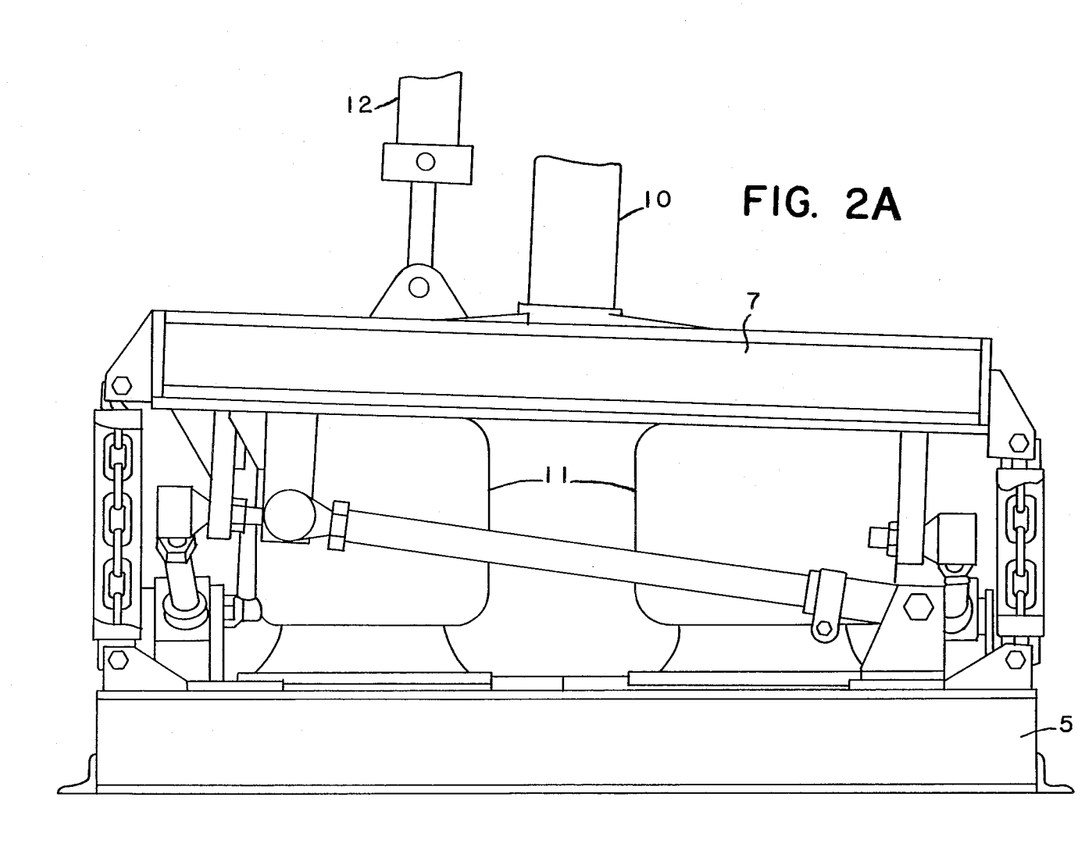
FIGS. 2a and 2B are diagrams of a portion of a prior art vibrator actuator systems using air bags.
Figure 2B:
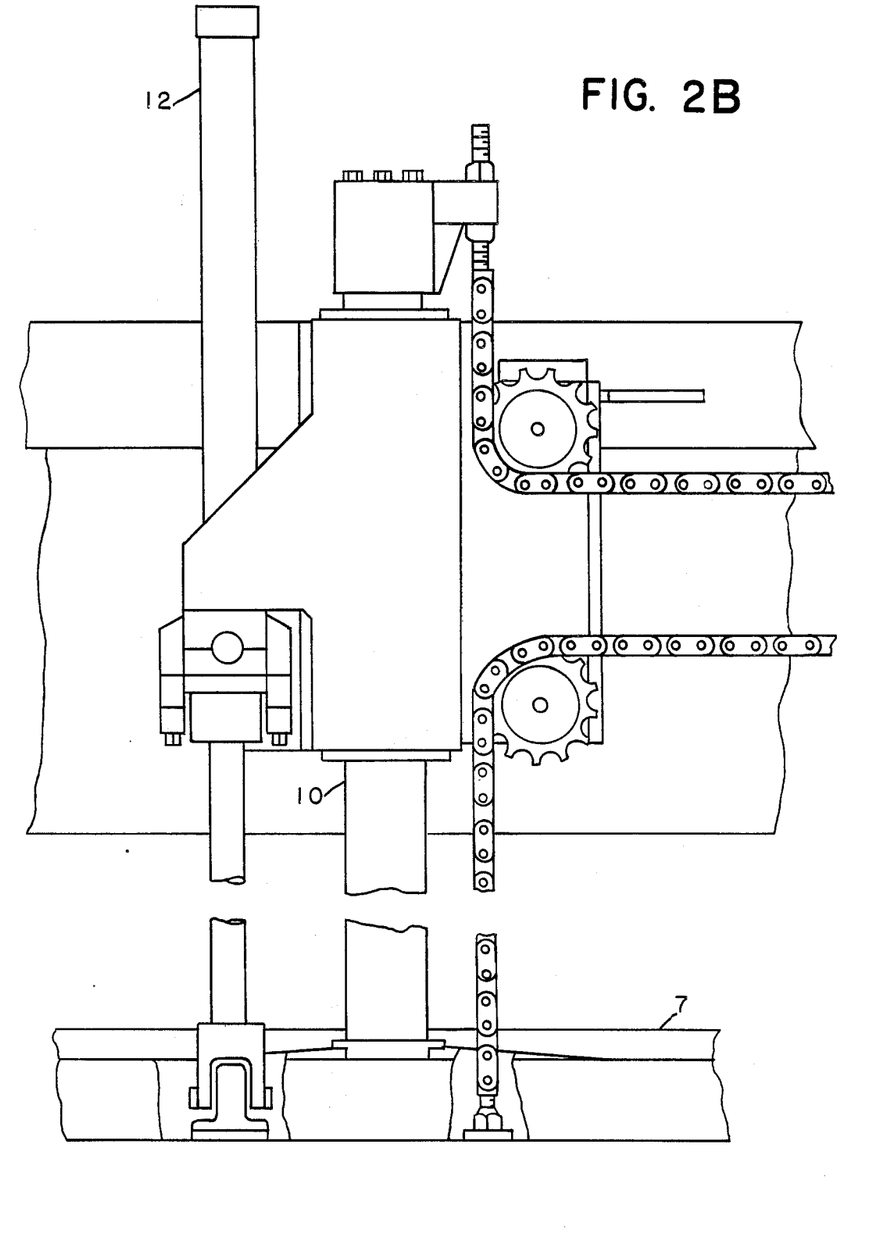

Referring first to FIG. 1, 2A and 2B, there is shown a truck 1 having the standard prior art vibrator actuator 3 mounted thereon. The vibrator actuator 3 is coupled to a baseplate 5 via the stilts 6 to which it is attached and a footpiece 7 for applying the static hold-down force of the truck as shown also in FIG. 2. The static force applied to the baseplate 5 is provided by the weight of the truck and the weight of the actuator system in combination. This force is applied to the baseplate 5 by the truck bed 9 through the lift cylinder 12 resting on intermediate air springs or air bags 11 as shown in FIG. 2. The lift column 10 acts as a guide.

The hydraulic lift cylinder 12 is activated when hydraulic fluid is ported through a valve to raise and lower the actuator/baseplate assembly. The valve is solenoid driven and connected to a hydraulic pump.

In practice, the baseplate is lowered until it contacts the ground and raises the truck chassis, preferably without lifting the wheels off the ground and applying a predetermined static weight or downward force (holddown) to the baseplate resulting from the weight of the truck and the weight of the actuator system. The actuator is then turned on in a programmed manner to impart acoustic energy to the ground through the baseplate. The acoustic energy imparted by the actuator is less than the hold-down. For example, if there is 40,000 pounds of hold-down, the vibration would be plus or minus 30,000 pounds around that force to avoid decoupling of the base plate with the earth. It is prevention of such decoupling which is one of the features of this invention. This is accomplished by accurately measuring the hold-down force, a measurement not accurately discerned by the prior art, to (1) determine that the baseplate is in contact with the ground and (2) to determine the maximum acoutical energy which can be applied to the baseplate without causing decoupling.

The hold-down force is measured in conjunction with the air bags 11. The air bags are preferably designed to compress to about half of their initial volume by the application of the desired hold-down force thereto. The pressure in the air bags is monitored and, knowing the area of the air bags, a direct reading of the force being applied by the upper assembly or truck bed 9 to the baseplate 5 is obtained. This reading is used in conjunction with other equipment to permit the truck to be lifted off the ground only to the extent necessary to provide the desired hold-down. This reading can also be used to monitor leakage of the air bags and maintain the desired starting conditions therein by causing air to be added or subtracted therefrom. The vibrator actuator system 3 is then set not to exceed this force to prevent decoupling. A standard strain guage pressure transducer (not shown in FIGS. 1 or 2) is provided to measure the pressure in each of the air bags 11. The pressure in the air bags multiplied by the area of the air bags provides a known function of the force being applied thereto as is well known and provides a true reading as opposed to the questionable readings of the prior art.

Figure 3:
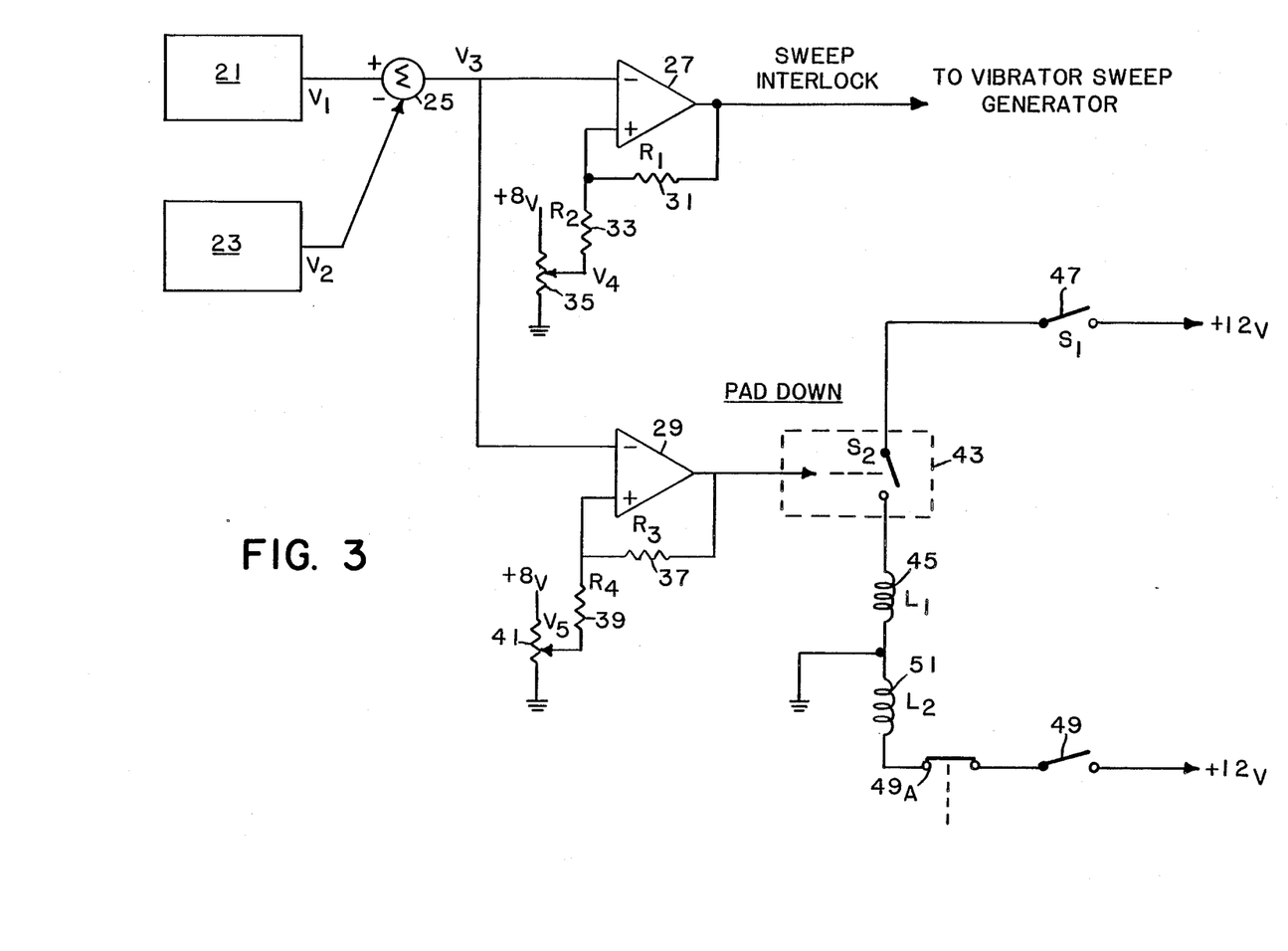
FIG. 3 is a block diagram of a seismic vibrator holddown weight monitor and controller in accordance with a first embodiment of the invention.

The pressure information derived from the pressure transducers in the air bags 11 is used to drive the lift cylinder or other devices as described hereinabove in the following manner:

Referring now to FIG. 3, in the preferred embodiment, four air bags are provided, these being front and rear bags on the passenger side and front and rear bags on the driver side. The air bags on the driver side are connected together and the air bags on the passenger side are connected together. Therefore only two sensors are required to determine the pressure on each side of the truck. These sensors are shown as strain gauges 21 and 23.

The input from strain gauges 21 and 23 is summed in summer 25, the output of which is fed to the (−) input of comparators 27 and 29. Resistors 31 and 33 and variable resistor 35 are preset to provide the sweep interlock threshold for comparator 27 whereas resistors 37 and 39 and variable resistor 41 are preset to provide the pad down threshold for comparator 29. The sweep interlock signal induces operation of the vibrator sweep generator whereas the pad down signal operates a switch 43, which can be an FET, a relay or the like to energize the down valve solenoid 45 when the down switch 47 is closed to move the pad down. If the up switch 49 is closed and the down switch 47 is open, the up valve solenoid 51 will be energized to cause the pad to move upwardly. Switch 43 is normally closed whereby, when the pad has gone down sufficiently, the switch 43 will open. This will operate as an inhibit to valve solenoid 45 and prevent further downward movement of the pad. The pad cam switch 49A is normally closed. When the base plate is raised to provide adequate clearance from the ground the pad cam switch contacts are opened to inhibit further upward travel.

Figure 4:
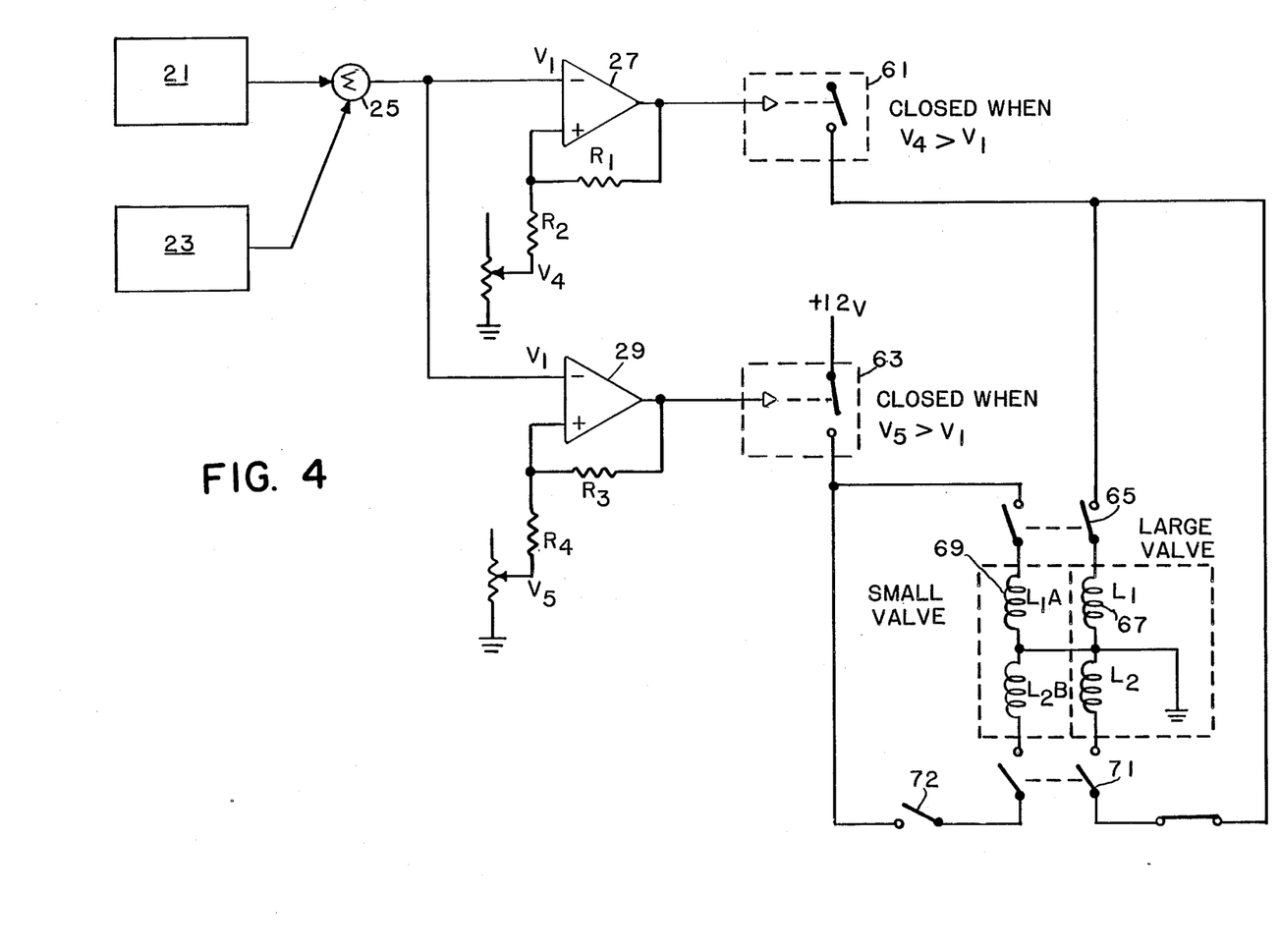
FIG. 4 is a block diagram of a seismic vibrator holddown weight monitor and controller in accordance with a second embodiment of the invention.

When the pad comes down and engages the earth, there is a substantial amount of seismic energy generated thereby which can still be propogating when a test is run. This can cause erroneous readings. This problem also exists upon lifting the pad from the earth. It is therefore desireable to program the lift and/or drop so that there is slow down at the terminal portion of the drop and slow down at the beginning portion of the lift to minimize generation of such seismic energy. This is accomplished with the dual valve lift control system of FIG. 4, wherein like numbers refer to like elements as in FIG. 3. The circuits of FIGS. 3 and 4 are identical through the outputs of comparators 27 and 29.

Switches 61 and 63 are normally closed, switch 61 opening when the voltage at the (+) input of comparator 27 is greater than the voltage at the (−) input thereto, switch 63 opening when the voltage of the (+) input of comparator 29 is greater than the voltage at the (−) input thereto. When the pad down switch 65 is closed, valve solenoids 67 and 69 are energized to cause the pad to be pushed down, such as by porting oil into a cylinder. When the threshold is reached at comparator 27, wherein the (−) input voltage is greater than the (+) input voltage thereto, the switch 61 opens and only relay 69 is energized. This causes pad to be pushed down at a much slower rate, such as by porting or pumping oil into the cylinder at a much slower rate. When the pad has reached its final desired position (adequate hold-down being achieved), the voltage on the (−) input to comparator 29 will be greater than the voltage on the (+) input thereto, thereby opening switch 63 and deenergizing valve solenoid 69. This stops further downward movement of the pad.

For upward movement of the pad, the pad down switch 65 contacts are opened and pad up switch contacts 71 are closed. For the pad up cam switch 72, both sets of contacts are normally closed. Initially, only solenoid L2 will be energized, however, solenoid L2B will not be initially energized because switch 63 will be open due to VS>V1 (full vehicle hold-down weight still rests on the pad). When the baseplate loses contact with the ground, switch 63 will close and both solenoids L2B and L2 will be energized, thereby speeding up the rate at which the baseplate is lifted. Once the pad is lifted to a position allowing adequate ground clearance, the pad up cam switch contacts 72 are opened, de-energizing solenoids L2 and L2B.

Figure 5:
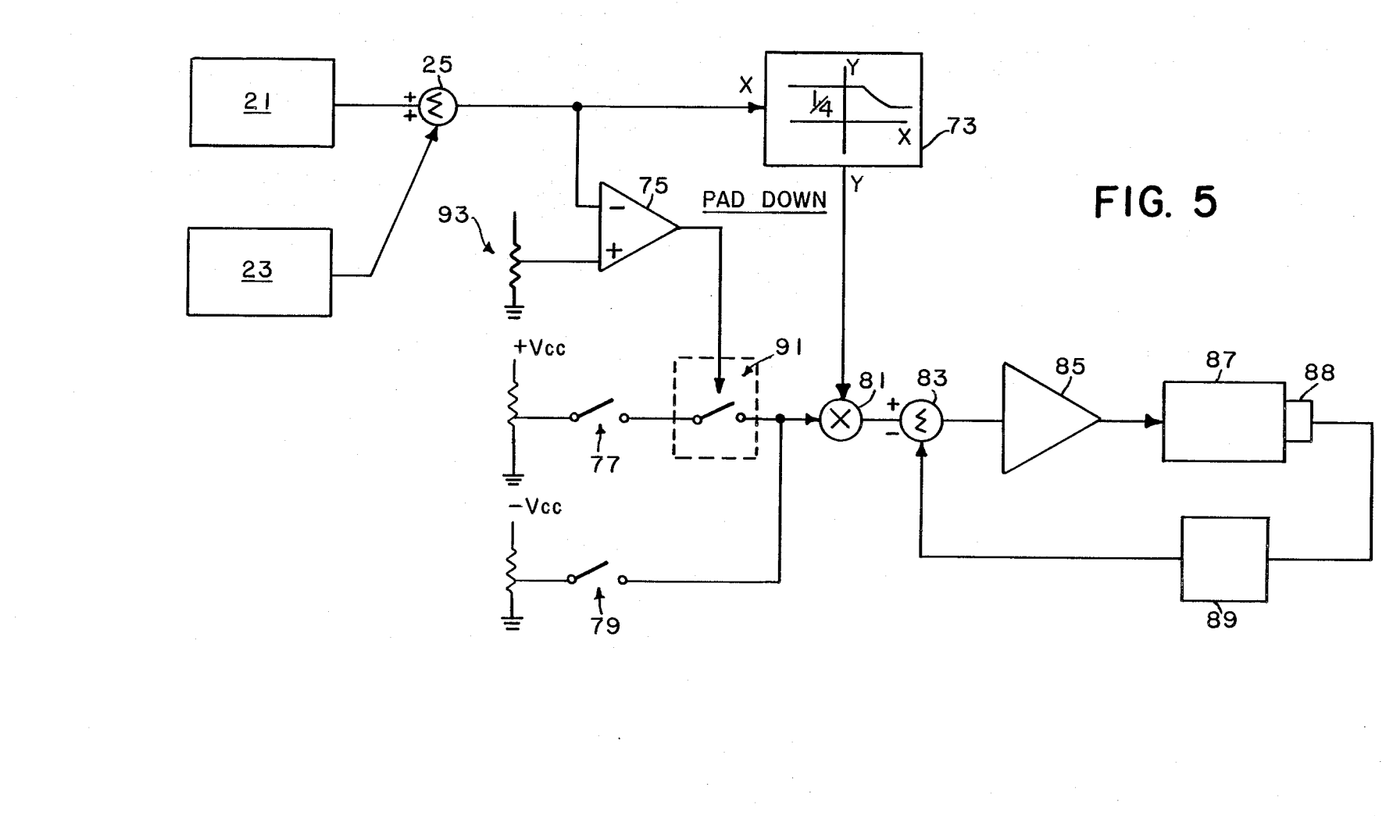
FIG. 5 is a block diagram of a seismic vibrator holddown weight monitor and controller in accordance with a third embodiment of the invention.

Referring now to FIG. 5, there is shown a proportional control circuit. The inputs from the strain gauges 21 and 23 are summed in summer 25 as in the embodiments of FIGS. 3 and 4. The output of the summer is fed to a non-linear function generator 73 which provides an output signal Y which is determined by the value of the input X thereto in accordance with the function as shown. Such circuits are well known and need not be further explained herein. It can be seen that for values of X up to slightly greater than zero, Y is 1 and for large values of X, Y is one-fourth. In the intermediate range, Y drops off linearly from one to one-fourth. Accordingly, for a certain voltage X in to function generator 73, the multiplier 81 provides a product signal output to the summer 83 which is part of a closed loop composed of power amplifier 85, electrohydraulic four-way valve 87 which control positioning of the pad, a linear differential transformer for sensing the valve spool position 88 and linear voltage differential transformer demodulator 89, the closed loop providing a voltage to summer 83 which is proportional to the spool position of the servovalve 87. It follows that, for a certain voltage in to the summer 83, there is provided a certain orifice opening in the servovalve 87. The flow rate through the valve will be proportional to the size of the opening.

It can be seen that the non-linear function 73 will change the rate at which the valve 87 will be opened and/or closed, the function being programmed to correspond to hold-down weight or force. Therefore, if the pad is to go down and switch 77 is closed, when X is a small number, the pad will come down very quickly because Y will be "one" due to large opening of the valve 87. When a predetermined holdown weight is reached where the curve in generator 73 turns downward, Y will gradually decrease to a value of one-quarter and cause the valve 87 to open less or to close more.

The multiplier 81 provides an output Y when there is an input thereto from one of the switches 77 and 79 (i.e., one of switches 77 and 79 is closed). If pad down switch 77 is closed, a positive signal is applied to multiplier 81 along with an initial large Y signal to provide such large signal to amplifier 85 and valve 87 to cause initial rapid opening of the valve and rapid dropping of the pad initially with slowing down of the rate of pad drop as the curve of generator 73 goes from a value of "1" to a value of "one-quarter". If pad up switch 79 is closed, a negative signal is applied to multiplier 81 and causes a negative signal to be applied to valve 87 via amplifier 85 to cause closing of the valve at an initial slow rate with the rate increasing as the curve of generator 73 goes from a value of "one-quarter" to a value of "1" with raising of the pad. The switch 91 is operated by comparator 75 which compares the output of the summer 25 (the holdown force) with a predetermined threshold provided by variable resistor input 93. When the holdown voltage has been reached, the output of comparator 75 will cause switch 91 to open, thereby causing a zero output to be provided by multiplier 81 and causing valve 87 to close.

Figure 6:
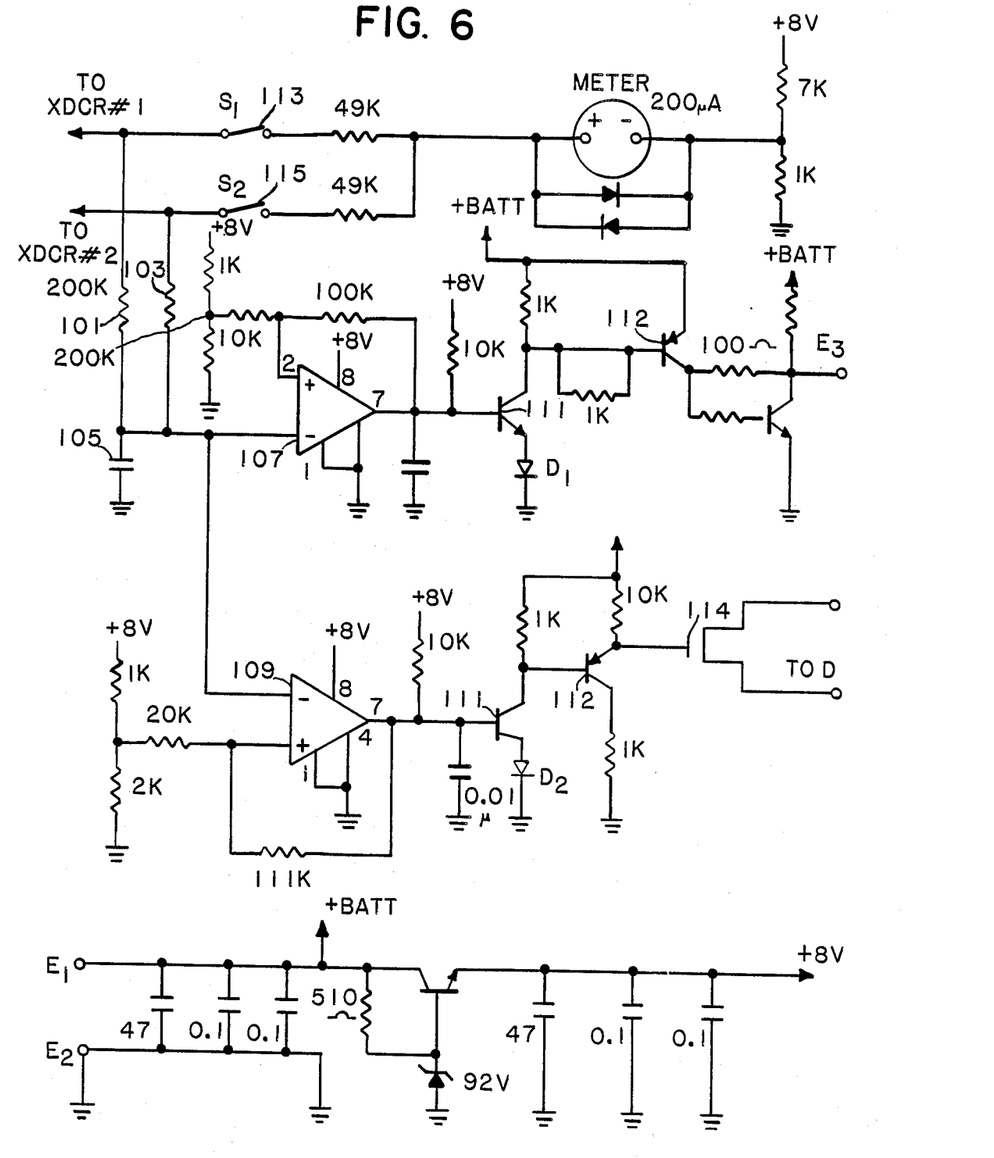
FIG. 6 is a circuit diagram of the circuit of FIG. 3.

A circuit diagram of the preferred circuit of FIG. 3 which will accomplish the function of the above described circuits is shown in FIG. 6. Only the driver for energizing coil L1 (45) of FIG. 3 is shown. The signals from the two transducers XDCR #1 and XDCR #2 are summed with resistors 101 and 103 whereby the voltage across capacitor 105 is proportional to the sum of the two pressures. Capacitor 105 removes unwanted transients and acts as a filter. This signal is fed to one input of each of comparators 107 and 109, comparator 107 having its other input providing a reference voltage whereby when the pressure sensed exceeds the reference threshold (the pad is down), transistor 111 lights up a light to indicate that sweep interlock has occurred and provides a signal at output E3 which can be used for the vibrator electronics to indicated that a chirp or vibration can now be commenced since the pad is on the ground with proper hold-down. The other input to comparator 109 provides a reference voltage for a second threshold which is normally higher than the reference threshold for comparator 107 and energized the lift solenoid to lower the pad additionally to achieve an additional hold-down force margin. When full holddown is achieved, comparator output 109 goes high, turning off transistor 111 (U5-2N2222) and light D2 goes off indicating the down solenoid valve is no longer energized. With transistor 111 off, driver transistor 112 (U6-2N2907) is also off, placing the gate voltage on the FET 114 (IRF9533) at the battery voltage. This turns off the FET and de-energized the down solenoid valve. Switches 113 and 115 are utilized to provide a reading of the pressure on one set of air bags for switch 113 and for the other set of air bags for switch 115. A sum of the pressures is provided if switches 113 and 115 are simultaneously closed.

It can be seen that there has been provided a series of circuits whereby the pad or baseplate of a seismic signal generator system is made to contact the earth with optional changes in the rate of pad drop and/or rise to reduce seismic noise as well as reduce the time required to raise and lower the baseplate, thereby improving productivity.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:

1. A system for controlling the application and removal of hold-down weight of a vehicle means carried seismic vibrator, to minimize the generation of unwanted seismic energy wherein said vibrator is mounted on a base plate secured to a foot piece positioned thereabove with pressurized air bag means disposed between said base plate and said foot piece, comprising:

support means for applying at least a portion of the weight of said vehicle means to said base plate through said foot piece and air bag means;

means for moving said support means into and out of contact with the ground below said vehicle means; and means for continuously controlling the rate of movement of said support means; and means for continously monitoring the level of pressure in said air bag means; and means for continuously comparing said monitored pressure to a predetermined threshold level.

2. The system of claim 1, wherein said rate control means further comprises:

means for decreasing said rate of movement of said support means when said monitored pressure level exceeds said predetermined threshold level.

3. The system of claim 2, wherein said rate control means comprises:

means for increasing said rate of movement of said support means when said monitored pressure level falls below said predetermined threshold level.

4. A method for controlling the application of hold-down weight for a seismic vibrator to minimize the generation of unwanted seismic energy, comprising:

applying at least a portion of said hold-down weight to the earth;

continuously sensing the value of a parameter proportional to the weight applied to the earth during said application; and continuously controlling the rate of application of said hold-down weight in response to said sensed value.

5. The method of claim 4, further including:

providing pressurized air bag means between said hold-down weight and the earth; and wherein sensed value comprises the level of pressure inside said air bag means.

6. The method of claim 4, wherein said step of controlling comprises:

decreasing said rate of application in response to an increase in said sensed value.

7. The method of claim 4, wherein said step of controlling comprises:

altering the rate of application as the magnitude of said sensed value reaches a predetermined threshold magnitude.

8. The method of claim 4, wherein said step of controlling comprises:

altering the rate of application in substantial proportion to the magnitude of said sensed value.

9. The method of claim 4, wherein said step of controlling comprises:

maintaining the said rate of application at a first level below a predetermined first threshold magnitude of said sensed value, and maintaining said rate of application at a second level above said first threshold magnitude.

10. The method of claim 9, wherein said step of controlling further comprises:

terminating further application of weight in response to a second threshold magnitude of said sensed value above said first threshold magnitude.

11. A method for mounting and controlling the removal of hold-down weight for a seismic vibrator to minimize the generation of unwanted seismic energy, comprising:

removing at least a portion of said hold-down weight from the earth;

continuously sensing the value of a parameter proportional to the weight removed from the earth during said removal; and continuously controlling the rate of removal of said hold-down weight in response to said sensed value.

12. The method of claim 11, further including:

providing pressurized air bag means between said hold-down weight and the earth; and wherein sensed value comprises the level of pressure inside said air bag means.

13. The method of claim 11, wherein said step of controlling comprises:

increasing said rate of removal in response to a decrease in said sensed value.

14. The method of claim 11, wherein said step of controlling comprises:

altering the rate of removal as the magnitude of said sensed value reaches a predetermined threshold magnitude.

15. The method of claim 11, wherein said step of controlling comprises:

altering said rate of removal in substantial proportion to the magnitude of said sensed value.

16. The method of claim 11, wherein said step of controlling comprises:

maintaining said rate of removal at a first level above a predetermined first threshold magnitude of said sensed value, and maintaining said rate of removal at a second level when said sensed value is below said first threshold magnitude.

17. The method of claim 16, wherein said step of controlling further comprises:

terminating further removal of weight when said sensed value reaches a second threshold magnitude below said first threshold magnitude.

* * * * *